United States Patent
Sommers

(10) Patent No.: US 11,483,227 B2
(45) Date of Patent: Oct. 25, 2022

(54) METHODS, SYSTEMS AND COMPUTER READABLE MEDIA FOR ACTIVE QUEUE MANAGEMENT

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/069,768

(22) Filed: Oct. 13, 2020

(65) Prior Publication Data

US 2022/0116304 A1    Apr. 14, 2022

(51) Int. Cl.
G06F 15/173    (2006.01)
H04L 43/50    (2022.01)
H04L 43/062    (2022.01)
H04L 43/08    (2022.01)
H04L 67/133    (2022.01)

(52) U.S. Cl.
CPC ............ *H04L 43/50* (2013.01); *H04L 43/062* (2013.01); *H04L 43/08* (2013.01); *H04L 67/133* (2022.05)

(58) Field of Classification Search
CPC ......... H04L 43/50; H04L 67/40; H04L 43/08; H04L 43/062
See application file for complete search history.

(56) References Cited

U.S. PATENT DOCUMENTS

| | | | |
|---|---|---|---|
| 4,792,753 A | 12/1988 | Iwai | |
| 5,247,517 A | 9/1993 | Ross et al. | |
| 5,343,463 A | 8/1994 | Van Tetering et al. | |
| 5,390,314 A | 2/1995 | Swanson | |
| 5,477,531 A | 12/1995 | McKee et al. | |
| 5,535,338 A | 7/1996 | Krause et al. | |
| 5,568,471 A | 10/1996 | Hershey et al. | |
| 5,571,963 A | 11/1996 | Balchin | |
| 5,583,792 A | 12/1996 | Li et al. | |

(Continued)

FOREIGN PATENT DOCUMENTS

| | | |
|---|---|---|
| CN | 104320274 A | 1/2015 |
| CN | 107104903 A | 8/2017 |

(Continued)

OTHER PUBLICATIONS

Non-Final Office Action for U.S. Appl. No. 16/039,283 (dated Jul. 8, 2020).

(Continued)

*Primary Examiner* — Umar Cheema
*Assistant Examiner* — Tesfu N Mekonen

(57) ABSTRACT

The subject matter described herein includes methods, systems, and computer readable media for active queue management. A method for active queue management occurs at a network test system (NTS). The method includes transmitting, by a test packet generator and during a test session, a test packet to a system under test (SUT); receiving queue performance information associated with a SUT queue related to the test packet; generating, utilizing the queue performance information, control signaling information usable for controlling the test packet generator; and controlling the test packet generator using the control signaling information.

18 Claims, 4 Drawing Sheets

(56) References Cited

U.S. PATENT DOCUMENTS

| | | |
|---|---|---|
| 5,590,285 A | 12/1996 | Krause et al. |
| 5,600,632 A | 2/1997 | Schulman |
| 5,657,438 A | 8/1997 | Wygodny et al. |
| 5,671,351 A | 9/1997 | Wild et al. |
| 5,751,963 A | 5/1998 | Umetsu |
| 5,761,486 A | 6/1998 | Watanabe et al. |
| 5,787,147 A | 7/1998 | Gundersen |
| 5,787,253 A | 7/1998 | McCreery et al. |
| 5,812,780 A | 9/1998 | Chen et al. |
| 5,822,520 A | 10/1998 | Parker |
| 5,838,919 A | 11/1998 | Schwaller et al. |
| 5,850,386 A | 12/1998 | Anderson et al. |
| 5,850,388 A | 12/1998 | Anderson et al. |
| 5,854,889 A | 12/1998 | Liese et al. |
| 5,878,032 A | 3/1999 | Mirek et al. |
| 5,905,713 A | 5/1999 | Anderson et al. |
| 5,974,237 A | 10/1999 | Shurmer et al. |
| 5,974,457 A | 10/1999 | Waclawsky et al. |
| 5,978,940 A | 11/1999 | Newman et al. |
| 5,982,852 A | 11/1999 | Schwartz |
| 5,991,265 A | 11/1999 | Lincoln |
| 6,011,777 A | 1/2000 | Kunzinger |
| 6,031,528 A | 2/2000 | Langfahl, Jr. |
| 6,044,091 A | 3/2000 | Kim |
| 6,108,800 A | 8/2000 | Asawa |
| 6,122,670 A | 9/2000 | Bennett et al. |
| 6,148,277 A | 11/2000 | Asava et al. |
| 6,172,989 B1 | 1/2001 | Yanagihara et al. |
| 6,173,333 B1 | 1/2001 | Jolitz et al. |
| 6,189,031 B1 | 2/2001 | Badger et al. |
| 6,233,256 B1 | 5/2001 | Dieterich et al. |
| 6,252,891 B1 | 6/2001 | Perches |
| 6,279,124 B1 | 8/2001 | Brouwer et al. |
| 6,295,557 B1 | 9/2001 | Foss et al. |
| 6,314,531 B1 | 11/2001 | Kram |
| 6,317,788 B1 | 11/2001 | Richardson |
| 6,321,264 B1 | 11/2001 | Fletcher et al. |
| 6,345,302 B1 | 2/2002 | Bennett et al. |
| 6,363,056 B1 | 3/2002 | Beigi et al. |
| 6,414,939 B1 | 7/2002 | Yamato |
| 6,430,617 B1 | 8/2002 | Britt et al. |
| 6,446,121 B1 | 9/2002 | Shah et al. |
| 6,507,923 B1 | 1/2003 | Wall et al. |
| 6,526,259 B1 | 2/2003 | Ho |
| 6,529,475 B1 | 3/2003 | Wan et al. |
| 6,535,487 B1 | 3/2003 | Biswas et al. |
| 6,542,854 B2 | 4/2003 | Yang et al. |
| 6,545,979 B1 | 4/2003 | Poulin |
| 6,549,517 B1 | 4/2003 | Aweya et al. |
| 6,601,020 B1 | 7/2003 | Myers |
| 6,621,805 B1 | 9/2003 | Kondylis et al. |
| 6,678,246 B1 | 1/2004 | Smyth |
| 6,691,167 B2 | 2/2004 | Procopio et al. |
| 6,717,917 B1 | 4/2004 | Weissberger et al. |
| 6,769,054 B1 | 7/2004 | Sahin et al. |
| 6,785,238 B1 | 8/2004 | Kago |
| 6,792,393 B1 | 9/2004 | Farel et al. |
| 6,826,259 B2 | 11/2004 | Hoffman |
| 6,845,352 B1 | 1/2005 | Wang |
| 6,917,595 B2 | 7/2005 | Chang et al. |
| 7,039,712 B2 | 5/2006 | Valavi et al. |
| 7,096,264 B2 | 8/2006 | Bonney et al. |
| 7,099,438 B2 | 8/2006 | Rancu et al. |
| 7,123,616 B2 | 10/2006 | Weissberger et al. |
| 7,143,159 B1 | 11/2006 | Grace et al. |
| 7,159,184 B2 | 1/2007 | Ullah et al. |
| 7,222,255 B1 | 5/2007 | Claessens et al. |
| 7,277,395 B2 | 10/2007 | Rosen et al. |
| 7,304,951 B2 | 12/2007 | Rhee |
| 7,327,686 B2 | 2/2008 | Standridge |
| 7,328,134 B1 | 2/2008 | Burbidge, III et al. |
| 7,342,897 B1 | 3/2008 | Nader et al. |
| 7,366,174 B2 | 4/2008 | MacFaden et al. |
| 7,418,492 B1 | 8/2008 | Cohen et al. |
| 7,468,947 B2 | 12/2008 | Mannal et al. |
| 7,486,728 B2 | 2/2009 | Park |
| 7,507,948 B2 | 3/2009 | Park et al. |
| 7,525,473 B2 | 4/2009 | Chu et al. |
| 7,526,691 B1 | 4/2009 | Jayabharathi et al. |
| 7,603,372 B1 | 10/2009 | Honicky, Jr. et al. |
| 7,627,669 B2 | 12/2009 | Dugatkin et al. |
| 7,730,492 B1 | 6/2010 | Blaukopf et al. |
| 7,783,463 B2 | 8/2010 | Herro |
| 7,814,495 B1 | 10/2010 | Lim et al. |
| 7,840,664 B2 | 11/2010 | Dugatkin et al. |
| 7,865,908 B2 | 1/2011 | Garg et al. |
| 7,873,056 B2 | 1/2011 | Higuchi et al. |
| 7,890,951 B2 | 2/2011 | Vinberg et al. |
| 7,899,048 B1 | 3/2011 | Walker et al. |
| 7,908,130 B2 | 3/2011 | Van Ginkel et al. |
| 7,945,657 B1 | 5/2011 | McDougall et al. |
| 7,979,225 B2 | 7/2011 | Muller et al. |
| 8,068,602 B1 | 11/2011 | Bluman et al. |
| 8,145,470 B2 | 3/2012 | Green |
| 8,286,147 B2 | 10/2012 | Alpern et al. |
| 8,694,644 B2 | 4/2014 | Chen et al. |
| 8,718,070 B2 | 5/2014 | Koponen et al. |
| 8,761,187 B2 | 6/2014 | Barde |
| 8,805,951 B1 | 8/2014 | Faibish et al. |
| 8,898,333 B1 | 11/2014 | White et al. |
| 8,914,432 B2 | 12/2014 | Hannel et al. |
| 8,942,109 B2 | 1/2015 | Dorenbosch et al. |
| 8,949,830 B2 | 2/2015 | Kannan et al. |
| 8,959,185 B2 | 2/2015 | Nakil et al. |
| 8,984,341 B1 | 3/2015 | Chandrasekharapuram et al. |
| 9,042,245 B2 | 5/2015 | Tzannes et al. |
| 9,049,271 B1 * | 6/2015 | Hobbs .................. H04L 65/601 |
| 9,065,770 B2 | 6/2015 | Chew et al. |
| 9,231,849 B2 | 1/2016 | Hyoudou et al. |
| 9,294,296 B2 | 3/2016 | Kirschnick et al. |
| 9,317,252 B2 | 4/2016 | Roy et al. |
| 9,436,566 B2 | 9/2016 | Panda et al. |
| 9,503,382 B2 | 11/2016 | DeCusatis et al. |
| 9,507,616 B1 | 11/2016 | Ramanath et al. |
| 9,524,299 B2 | 12/2016 | Lahiri et al. |
| 9,529,684 B2 | 12/2016 | Sincan et al. |
| 9,544,233 B2 | 1/2017 | Ansari et al. |
| 9,614,689 B2 | 4/2017 | Cook et al. |
| 9,628,339 B1 | 4/2017 | Thai et al. |
| 9,647,909 B2 | 5/2017 | Kuan et al. |
| 9,674,639 B2 | 6/2017 | Qiu et al. |
| 9,680,728 B2 | 6/2017 | Besser |
| 9,705,849 B2 | 7/2017 | Sood et al. |
| 9,785,527 B2 | 10/2017 | Regev et al. |
| 9,819,551 B2 | 11/2017 | Forster et al. |
| 9,898,317 B2 | 2/2018 | Nakil et al. |
| 9,967,165 B2 | 5/2018 | Arora et al. |
| 9,971,620 B2 | 5/2018 | Karnes |
| 10,015,072 B2 | 7/2018 | Cantwell et al. |
| 10,063,473 B2 | 8/2018 | Wenig |
| 10,069,694 B1 | 9/2018 | Schwartz et al. |
| 10,135,702 B2 | 11/2018 | Lahiri |
| 10,341,215 B2 | 7/2019 | Ramanath et al. |
| 10,579,408 B2 | 3/2020 | Wang et al. |
| 10,623,296 B2 | 4/2020 | Haramaty et al. |
| 10,686,671 B1 | 6/2020 | Mozumdar et al. |
| 10,693,817 B1 | 6/2020 | Melkild |
| 10,733,088 B1 | 8/2020 | Sommers |
| 10,742,533 B2 | 8/2020 | Yadav et al. |
| 10,868,730 B2 | 12/2020 | Mozumdar et al. |
| 10,880,019 B1 | 12/2020 | Mestre Adrover et al. |
| 10,880,197 B2 | 12/2020 | Naskar et al. |
| 11,323,354 B1 | 5/2022 | Sommers |
| 11,388,081 B1 | 7/2022 | Sommers et al. |
| 11,398,968 B2 | 7/2022 | Laslau |
| 11,405,302 B1 | 8/2022 | Liu et al. |
| 2001/0016867 A1 | 8/2001 | Hu et al. |
| 2002/0056100 A1 | 5/2002 | Shimomura et al. |
| 2002/0085502 A1 | 7/2002 | Chheda et al. |
| 2002/0087282 A1 | 7/2002 | Millard |
| 2002/0105911 A1 | 8/2002 | Pruthi et al. |
| 2002/0138226 A1 | 9/2002 | Doane |
| 2002/0162059 A1 | 10/2002 | McNeeley et al. |
| 2002/0172205 A1 | 11/2002 | Tagore-Brage et al. |

(56) References Cited

U.S. PATENT DOCUMENTS

| | | |
|---|---|---|
| 2002/0184527 A1 | 12/2002 | Chun et al. |
| 2002/0184614 A1 | 12/2002 | Davia et al. |
| 2003/0009544 A1 | 1/2003 | Wach |
| 2003/0036897 A1 | 2/2003 | Flores et al. |
| 2003/0043434 A1 | 3/2003 | Brachmann et al. |
| 2003/0061506 A1 | 3/2003 | Cooper et al. |
| 2003/0069952 A1 | 4/2003 | Tams et al. |
| 2003/0139919 A1 | 7/2003 | Sher et al. |
| 2003/0154432 A1 | 8/2003 | Scott et al. |
| 2003/0182408 A1 | 9/2003 | Hu |
| 2003/0188003 A1 | 10/2003 | Sylvest et al. |
| 2003/0191590 A1 | 10/2003 | Narayan et al. |
| 2003/0231741 A1 | 12/2003 | Rancu et al. |
| 2004/0010787 A1 | 1/2004 | Traut et al. |
| 2004/0015600 A1 | 1/2004 | Tiwary et al. |
| 2004/0021678 A1 | 2/2004 | Ullah et al. |
| 2004/0111502 A1 | 6/2004 | Oates |
| 2004/0111519 A1 | 6/2004 | Fu et al. |
| 2004/0117474 A1* | 6/2004 | Ginkel .................. H04L 47/263 709/224 |
| 2004/0139437 A1 | 7/2004 | Arndt |
| 2004/0190449 A1 | 9/2004 | Mannal et al. |
| 2004/0190606 A1 | 9/2004 | Deshpande |
| 2004/0236866 A1 | 11/2004 | Dugatkin et al. |
| 2005/0021715 A1 | 1/2005 | Dugatkin et al. |
| 2005/0039180 A1 | 2/2005 | Fultheim et al. |
| 2005/0116920 A1 | 6/2005 | Park et al. |
| 2005/0216234 A1 | 9/2005 | Glas et al. |
| 2005/0268298 A1 | 12/2005 | Hunt et al. |
| 2006/0002305 A1 | 1/2006 | Ginzburg |
| 2006/0025985 A1 | 2/2006 | Vinberg et al. |
| 2006/0037002 A1 | 2/2006 | Vinberg et al. |
| 2006/0072543 A1 | 4/2006 | Lloyd et al. |
| 2006/0123416 A1 | 6/2006 | Cibrario Bertolotti et al. |
| 2006/0129847 A1 | 6/2006 | Pitsos |
| 2006/0224375 A1 | 10/2006 | Barnett et al. |
| 2007/0038744 A1 | 2/2007 | Cocks et al. |
| 2007/0067374 A1 | 3/2007 | Iketani et al. |
| 2007/0069005 A1 | 3/2007 | Dickerson et al. |
| 2007/0112549 A1 | 5/2007 | Lau et al. |
| 2007/0133441 A1 | 6/2007 | Kang et al. |
| 2007/0165531 A1 | 7/2007 | Labrador et al. |
| 2007/0195776 A1 | 8/2007 | Zheng et al. |
| 2007/0213966 A1 | 9/2007 | Noble |
| 2007/0233453 A1 | 10/2007 | Ito et al. |
| 2007/0280243 A1 | 12/2007 | Wray et al. |
| 2007/0283347 A1 | 12/2007 | Bobroff et al. |
| 2008/0044018 A1 | 2/2008 | Scrimsher et al. |
| 2008/0163207 A1 | 7/2008 | Reumann et al. |
| 2008/0186968 A1 | 8/2008 | Farinacci et al. |
| 2008/0189700 A1 | 8/2008 | Schmidt et al. |
| 2008/0208554 A1 | 8/2008 | Igarashi |
| 2008/0221857 A1 | 9/2008 | Casotto |
| 2008/0244525 A1 | 10/2008 | Khalil et al. |
| 2009/0089038 A1 | 4/2009 | Nadgir et al. |
| 2009/0089781 A1 | 4/2009 | Shingai et al. |
| 2009/0119542 A1 | 5/2009 | Nagashima et al. |
| 2009/0168720 A1 | 7/2009 | Vinayakray-Jani et al. |
| 2009/0259704 A1 | 10/2009 | Aharoni et al. |
| 2009/0287837 A1 | 11/2009 | Felsher |
| 2009/0300613 A1 | 12/2009 | Doi |
| 2009/0307530 A1 | 12/2009 | Tarta |
| 2009/0327784 A1 | 12/2009 | Shah et al. |
| 2010/0008305 A1 | 1/2010 | Teo et al. |
| 2010/0111494 A1 | 5/2010 | Mazzaferri |
| 2010/0138920 A1 | 6/2010 | Kim et al. |
| 2010/0153055 A1* | 6/2010 | Mucha .................. H04L 43/50 702/122 |
| 2010/0153529 A1 | 6/2010 | Moser |
| 2010/0161864 A1 | 6/2010 | Barde et al. |
| 2010/0169882 A1 | 7/2010 | Ben-Yehuda et al. |
| 2010/0199275 A1 | 8/2010 | Mudigonda et al. |
| 2010/0235831 A1 | 9/2010 | Dittmer |
| 2010/0238923 A1 | 9/2010 | Cheon et al. |
| 2010/0241734 A1 | 9/2010 | Miyajima |
| 2010/0250824 A1 | 9/2010 | Belay |
| 2010/0299433 A1 | 11/2010 | De Boer et al. |
| 2010/0299666 A1 | 11/2010 | Agbaria et al. |
| 2010/0317420 A1 | 12/2010 | Hoffberg |
| 2010/0325191 A1 | 12/2010 | Jung et al. |
| 2010/0332212 A1 | 12/2010 | Finkelman |
| 2011/0010515 A1 | 1/2011 | Ranade |
| 2011/0010691 A1 | 1/2011 | Lu et al. |
| 2011/0066786 A1 | 3/2011 | Colbert |
| 2011/0066819 A1 | 3/2011 | Mashtizadeh et al. |
| 2011/0116719 A1 | 5/2011 | Bilobrov |
| 2011/0125892 A1 | 5/2011 | Rajan et al. |
| 2011/0126193 A1 | 5/2011 | Mullin et al. |
| 2011/0176441 A1 | 7/2011 | Matsuoka |
| 2011/0197190 A1 | 8/2011 | Hattori et al. |
| 2011/0202917 A1 | 8/2011 | Laor |
| 2011/0239214 A1 | 9/2011 | Frields et al. |
| 2011/0246171 A1 | 10/2011 | Cleeton et al. |
| 2011/0307739 A1 | 12/2011 | El Mahdy et al. |
| 2012/0054409 A1 | 3/2012 | Block et al. |
| 2012/0054740 A1 | 3/2012 | Chakraborty et al. |
| 2012/0060167 A1 | 3/2012 | Salsburg et al. |
| 2012/0084487 A1 | 4/2012 | Barde |
| 2012/0102492 A1 | 4/2012 | Iwata |
| 2012/0106423 A1 | 5/2012 | Nylander et al. |
| 2012/0110181 A1 | 5/2012 | Tsirkin |
| 2012/0120801 A1* | 5/2012 | Ramakrishnan ...... H04L 43/103 370/235 |
| 2012/0131576 A1 | 5/2012 | Hatta et al. |
| 2012/0159473 A1 | 6/2012 | Tsirkin |
| 2012/0192182 A1 | 7/2012 | Hayward et al. |
| 2012/0246644 A1 | 9/2012 | Hattori et al. |
| 2012/0284709 A1 | 11/2012 | Lorenc et al. |
| 2012/0290703 A1 | 11/2012 | Barabash et al. |
| 2012/0290766 A1 | 11/2012 | Oshins |
| 2012/0311387 A1 | 12/2012 | Santhosh et al. |
| 2012/0317555 A1 | 12/2012 | Aluru et al. |
| 2012/0317566 A1 | 12/2012 | Santos et al. |
| 2013/0013107 A1 | 1/2013 | Felique |
| 2013/0013657 A1 | 1/2013 | Emelko et al. |
| 2013/0019242 A1 | 1/2013 | Chen et al. |
| 2013/0036416 A1 | 2/2013 | Raju et al. |
| 2013/0055026 A1 | 2/2013 | Hatano et al. |
| 2013/0080999 A1 | 3/2013 | Yang |
| 2013/0139154 A1 | 5/2013 | Shah |
| 2013/0139155 A1 | 5/2013 | Shah |
| 2013/0139173 A1 | 5/2013 | Carter |
| 2013/0152083 A1 | 6/2013 | Miki et al. |
| 2013/0159021 A1 | 6/2013 | Felsher |
| 2013/0159650 A1 | 6/2013 | Wakamiya |
| 2013/0179879 A1 | 7/2013 | Zhang et al. |
| 2013/0227551 A1 | 8/2013 | Tsirkin |
| 2013/0238802 A1 | 9/2013 | Sarikaya |
| 2013/0247056 A1 | 9/2013 | Hattori et al. |
| 2013/0263118 A1 | 10/2013 | Kannan et al. |
| 2013/0275592 A1 | 10/2013 | Xu et al. |
| 2013/0282354 A1 | 10/2013 | Sayers et al. |
| 2013/0283265 A1 | 10/2013 | Acharya et al. |
| 2013/0288668 A1 | 10/2013 | Pragada et al. |
| 2013/0297769 A1 | 11/2013 | Chang et al. |
| 2013/0318528 A1 | 11/2013 | Hirose |
| 2013/0325433 A1 | 12/2013 | Albano et al. |
| 2013/0326175 A1 | 12/2013 | Tsirkin |
| 2013/0339956 A1 | 12/2013 | Murase et al. |
| 2013/0346987 A1 | 12/2013 | Raney et al. |
| 2014/0006358 A1 | 1/2014 | Wang et al. |
| 2014/0006570 A1 | 1/2014 | Loos et al. |
| 2014/0013306 A1 | 1/2014 | Gounares et al. |
| 2014/0047125 A1 | 2/2014 | Hyoudou et al. |
| 2014/0047272 A1 | 2/2014 | Breternitz et al. |
| 2014/0052852 A1 | 2/2014 | Dufour et al. |
| 2014/0067940 A1 | 3/2014 | Li et al. |
| 2014/0068335 A1 | 3/2014 | Bromley et al. |
| 2014/0081615 A1 | 3/2014 | Abdirashid et al. |
| 2014/0108001 A1 | 4/2014 | Brown et al. |
| 2014/0109051 A1 | 4/2014 | Mcdonald et al. |
| 2014/0160961 A1 | 6/2014 | Dragulescu et al. |
| 2014/0223431 A1 | 8/2014 | Yoshimura et al. |
| 2014/0229605 A1 | 8/2014 | Besser |

(56) References Cited

U.S. PATENT DOCUMENTS

| | | |
|---|---|---|
| 2014/0229781 A1 | 8/2014 | Whetsel |
| 2014/0229945 A1 | 8/2014 | Barkai et al. |
| 2014/0269709 A1 | 9/2014 | Benny et al. |
| 2014/0282425 A1 | 9/2014 | Zhao et al. |
| 2014/0289418 A1 | 9/2014 | Cohen et al. |
| 2014/0298335 A1 | 10/2014 | Regev et al. |
| 2014/0317293 A1 | 10/2014 | Shatzkamer |
| 2014/0317600 A1 | 10/2014 | Klunder et al. |
| 2014/0317625 A1 | 10/2014 | Ichikawa et al. |
| 2014/0321285 A1 | 10/2014 | Chew et al. |
| 2014/0378057 A1 | 12/2014 | Ramon et al. |
| 2015/0007174 A1 | 1/2015 | Jain |
| 2015/0029848 A1 | 1/2015 | Jain |
| 2015/0046141 A1 | 2/2015 | Lahiri et al. |
| 2015/0063166 A1 | 3/2015 | Sif et al. |
| 2015/0100958 A1 | 4/2015 | Banavalikar et al. |
| 2015/0120797 A1 | 4/2015 | Roy et al. |
| 2015/0135178 A1 | 5/2015 | Fischer et al. |
| 2015/0140956 A1 | 5/2015 | Prewitt, II et al. |
| 2015/0234725 A1 | 8/2015 | Cillis et al. |
| 2015/0236936 A1 | 8/2015 | Waldbusser |
| 2015/0293826 A1 | 10/2015 | Sincan et al. |
| 2015/0317169 A1 | 11/2015 | Sinha et al. |
| 2015/0332357 A1 | 11/2015 | McBride et al. |
| 2015/0333979 A1 | 11/2015 | Schwengler et al. |
| 2015/0334030 A1* | 11/2015 | Vasseur ............... H04L 47/115 370/230 |
| 2015/0365288 A1 | 12/2015 | Van Der Merwe et al. |
| 2016/0006844 A1 | 1/2016 | Tychina |
| 2016/0034289 A1 | 2/2016 | Amano et al. |
| 2016/0034372 A1 | 2/2016 | Panda et al. |
| 2016/0062781 A1 | 3/2016 | Tsirkin et al. |
| 2016/0110211 A1 | 4/2016 | Kames |
| 2016/0127333 A1 | 5/2016 | Sood et al. |
| 2016/0147987 A1 | 5/2016 | Jang et al. |
| 2016/0191545 A1 | 6/2016 | Nanda et al. |
| 2016/0232019 A1 | 8/2016 | Shah et al. |
| 2016/0248858 A1 | 8/2016 | Qiu et al. |
| 2016/0323243 A1 | 11/2016 | LeVasseur et al. |
| 2016/0352578 A1 | 12/2016 | Chen et al. |
| 2017/0024308 A1 | 1/2017 | Knoulich |
| 2017/0026806 A1 | 1/2017 | Jampani et al. |
| 2017/0048110 A1 | 2/2017 | Wu et al. |
| 2017/0085459 A1 | 3/2017 | Xia et al. |
| 2017/0094002 A1 | 3/2017 | Kumar et al. |
| 2017/0099195 A1 | 4/2017 | Raney |
| 2017/0099197 A1 | 4/2017 | Raney |
| 2017/0118102 A1 | 4/2017 | Majumder et al. |
| 2017/0126588 A1 | 5/2017 | Anand et al. |
| 2017/0141974 A1 | 5/2017 | Lahiri |
| 2017/0163510 A1 | 6/2017 | Arora et al. |
| 2017/0214694 A1 | 7/2017 | Yan |
| 2017/0295084 A1 | 10/2017 | Ramanath et al. |
| 2017/0353531 A1 | 12/2017 | Conn |
| 2018/0316543 A1 | 11/2018 | Hwang |
| 2019/0222481 A1* | 7/2019 | Hira .................. H04L 43/10 |
| 2019/0372881 A1 | 12/2019 | Hu et al. |
| 2020/0021512 A1 | 1/2020 | Naskar et al. |
| 2020/0028772 A1 | 1/2020 | Laslau |
| 2020/0034173 A1 | 1/2020 | Rosenberg et al. |
| 2020/0112524 A1 | 4/2020 | Sindhu et al. |
| 2020/0133688 A1 | 4/2020 | Shinde et al. |
| 2020/0195519 A1 | 6/2020 | Di Martino |
| 2020/0280518 A1* | 9/2020 | Lee .................. H04L 47/30 |
| 2020/0296023 A1* | 9/2020 | Kumar ............ H04L 43/0894 |
| 2020/0313999 A1* | 10/2020 | Lee .................. H04L 69/22 |
| 2020/0366588 A1 | 11/2020 | Bergeron |
| 2020/0412607 A1 | 12/2020 | Guan et al. |
| 2022/0116303 A1 | 4/2022 | Sommers et al. |
| 2022/0247661 A1 | 8/2022 | Liu et al. |
| 2022/0253324 A1 | 8/2022 | Liu et al. |

FOREIGN PATENT DOCUMENTS

| | | |
|---|---|---|
| CN | 108353004 B | 1/2022 |
| EP | 0895375 A2 | 2/1999 |
| EP | 3046288 A1 | 7/2016 |
| EP | 3110106 A1 | 12/2016 |
| EP | 3119034 A1 | 1/2017 |
| GB | 2565673 A | 2/2019 |
| JP | 7297912 | 11/1995 |
| JP | 11136288 | 5/1999 |
| JP | 2000049863 | 2/2000 |
| JP | 2000183883 | 6/2000 |
| JP | 2000278265 | 10/2000 |
| JP | 2001308924 | 11/2001 |
| JP | 2003508849 | 3/2003 |
| JP | 4620103 B2 | 11/2010 |
| JP | 4620103 B2 | 1/2011 |
| WO | 02056541 A2 | 7/2002 |
| WO | 2011002578 A1 | 1/2011 |
| WO | 2014030061 A2 | 2/2014 |
| WO | 2014160660 A1 | 10/2014 |
| WO | 2015023369 A1 | 2/2015 |
| WO | 2017083024 A1 | 5/2017 |
| WO | 2017176455 A1 | 10/2017 |
| WO | 2021015802 A1 | 1/2021 |

OTHER PUBLICATIONS

Communication pursuant to Article 94(3) EPC for European Application Serial No. 16 864 727.9 (dated May 4, 2020).

Byagowi et al., "Bringing the F16 Network into the Lab," OCP Global Summit, pp. 1-16 (2020).

Notice of Allowance and Fee(s) Due and Examiner-Initiated Interview Summary for U.S. Appl. No. 14/939,674 (dated Jul. 13, 2018).

Advisory Action and AFCP 2.0 Decision for U.S. Appl. No. 14/939,674 (dated May 4, 2018).

Final Office Action for U.S. Appl. No. 14/939,674 (dated Feb. 9, 2018).

Corrected Notice of Allowability for U.S. Appl. No. 14/960,865 (dated Feb. 7, 2018).

Notice of Allowance and Fee(s) Due for U.S. Appl. No. 14/960,865 (dated Jan. 2, 2018).

Non-Final Office Action for U.S. Appl. No. 14/939,674 (dated Sep. 21, 2017).

Non-Final Office Action for U.S. Appl. No. 14/960,865 (dated Apr. 21, 2017).

Zhang et al., "MPVisor: A Modular Programmable Data Plane Hypervisor," SOSR' 17, pp. 1-2 (Apr. 3-4, 2017).

Notice of Allowance and Fee(s) Due & Examiner-Initiated Interview Summary for U.S. Appl. No. 13/765,628 (dated Jan. 10, 2017).

Notification of Transmittal of the International Search Report and the Written Opinion of the International Searching Authority, or the Declaration for International Application No. PCT/US2016/054163 (dated Jan. 5, 2017).

Advisory Action and Examiner Initiated Interview Summary for U.S. Appl. No. 13/765,628 (dated Oct. 17, 2016).

Final Office Action for U.S. Appl. No. 13/765,628 (dated Jul. 27, 2016).

"Virtual Taps," Net Optics: Architecting Visibility Into Your Netowrk, p. 1-5 (accessed Jun. 30, 2016).

Kim et al., "In-band Network Telemetry (INT)," pp. 1-28 (Jun. 2016).

"Network function virtualization," https://en.wikipedia.org/wiki/Network_function_virtualization, pp. 1-7 (Nov. 23, 2015).

"Software-defined networking," https://en.wikipedia.org/wiki/Software-defined_networking, pp. 1-9 (Nov. 13, 2015).

"Ixia Phantom vTap with TapFlow Filtering," Ixia Data Sheet, Document No. 915-6805-01 Rev K, pp. 1-4 (Jul. 2015).

Non-Final Office Action for U.S. Appl. No. 13/765,628 (dated Dec. 1, 2014).

Notice of Allowance and Fee(s) Due for U.S. Appl. No. 10/317,312 (dated Dec. 9, 2010).

Interview Summary for U.S. Appl. No. 10/317,312 (dated Aug. 25, 2010).

(56) References Cited

OTHER PUBLICATIONS

Non-Final Office Action for U.S. Appl. No. 10/317,312 (dated May 7, 2010).
Final Office Action for U.S. Appl. No. 10/317,312 (dated Mar. 26, 2009).
Non-Final Office Action for U.S. Appl. No. 10/317,312 (dated Aug. 29, 2008).
Non-Final Office Action for U.S. Appl. No. 10/317,312 (dated Mar. 17, 2008).
Final Office Action for U.S. Appl. No. 10/317,312 (dated Sep. 12, 2007).
"TCP/IP model," http://en.wikipedia.org/wiki/TCP/IP_model, 8 pages (dated Aug. 2007).
Non-Final Office Action for U.S. Appl. No. 10/317,312 (dated Mar. 22, 2007).
Final Office Action for U.S. Appl. No. 10/317,312 (dated Aug. 11, 2006).
Non-Final Office Action for U.S. Appl. No. 10/317,312 (dated Jan. 30, 2006).
Kurose et al., "Computer Networking: A Top-Down Approach Featuring the Internet," pp. 167-172 (2001).
"UCB/LBNL/VINT Network Simulator—ns (version 2)," http://web.archive.org/web/20000819030658/http://www.isi.edu/nsnam/ns/, Information Sciences Institute, 4 pages (Aug. 2000).
Leon-Garcia et al., "Communication Networks Fundamentals Concepts and Key Architectures," pp. 57-63 and 575-577 (2000).
Fall et al., "Simulation-based Comparisons of Tahoe, Reno, and SACK TCP," 18 pages (Jan. 7, 1998).
Nichols, "Improving Network Simulation with Feedback," IEEE, 14 pages (1998).
Li et al., "A Simulation Study of TCP Performance in ATM Networks with ABR and UBR Services," IEEE, pp. 1269-1276 (1996).
Stevens, "TCP/IP Illustrated, vol. 1: The Protocols," pp. 1-3 (1994).
Final Office Action for U.S. Appl. No. 16/039,283 (dated Dec. 31, 2020).
Communication under Rule 71(3) EPC Intention to Grant for European Patent Application Serial No. 14 774 774.5 (dated May 20, 2019).
Communication pursuant to Article 94(3) EPC for European Patent Application Serial No. 14 774 774.5 (dated Nov. 6, 2018).
Advisory Action, Examiner-Initiated Interview Summary, and AFCP 2.0 Decision for U.S. Appl. No. 15/092,575 (dated Sep. 6, 2018).
Decision to grant a European patent pursuant to Article 97(1) EPC for European Patent Application Serial No. 14836839.2 (dated Jul. 26, 2018).
Final Office Action for U.S. Appl. No. 15/092,575 (dated Jun. 15, 2018).
Applicant-Initiated Interview Summary for U.S. Appl. No. 15/092,575 (dated Mar. 27, 2018).
Office Action for U.S. Appl. No. 15/092,575 (dated Dec. 15, 2017).
Notification of Transmillal of the International Search Report and the Written Opinion of the International Searching Authority, or the Declaration for International Application No. PCT/US2017/023625 (dated Jun. 13, 2017).
Notice of Allowance and Examiner Initiated Interview Summary for U.S. Appl. No. 14/224,024 (dated Jun. 3, 2017).
Communication of the extended European search report for European Application No. 14836839.2 (dated Feb. 10, 2017).
Non-Final Office Action for U.S. Appl. No. 14/224,024 (dated Jan. 10, 2017).
Communication of the extended European search report for European Patent Application No. 14774774.5 (dated Nov. 23, 2016).
Advisory Action for U.S. Appl. No. 14/224,024 (dated Sep. 27, 2016).
Notice of Allowance and Fee(s) Due for U.S. Appl. No. 14/251,547 (dated Aug. 23, 2016).
Notice of Allowance and Fee(s) Due for U.S. Appl. No. 13/969,085 (dated Aug. 10, 2016).

Notice of Allowance and Fee(s) Due for U.S. Appl. No. 14/749,606 (dated Jul. 27, 2016).
Applicant-Initiated Interview Summary for U.S. Appl. No. 14/224,024 (dated Jul. 18, 2016).
Final Office Action for U.S. Appl. No. 14/224,024 (dated Jun. 15, 2016).
Applicant-Initiated Interview Summary for U.S. Appl. No. 13/969,085 (dated Jun. 7, 2016).
Communication of European publication number and information on the application of Article 67(3) EPC for European Application No. 14836839.2 (dated May 25, 2016).
Applicant-Initiated Interview Summary for U.S. Appl. No. 14/224,024 (dated May 13, 2016).
Notice of Allowance and Fee(s) Due for U.S. Appl. No. 14/445,921 (dated May 12, 2016).
Final Office Action for U.S. Appl. No. 13/969,085 (dated Apr. 19, 2016).
Non-Final Office Action for U.S. Appl. No. 14/251,547 (dated Apr. 26, 2016).
Applicant-Initiated Interview Summary for U.S. Appl. No. 14/445,921 (dated Apr. 14, 2016).
Non-Final Office Action for U.S. Appl. No. 14/224,024 (dated Feb. 3, 2016).
Corrected Notice of Allowability for U.S. Appl. No. 14/158,659 (dated Jan. 11, 2016).
Communication of European publication number and information on the application of Article 67(3) EPC for European Application No. 14774774.5 (dated Jan. 7, 2016).
Notice of Allowance and Fee(s) Due for U.S. Appl. No. 14/158,659 (dated Dec. 11, 2015).
Non-Final Office Action for U.S. Appl. No. 14/445,921 (dated Jan. 14, 2016).
Non-Final Office Action for U.S. Appl. No. 13/969,085 (dated Sep. 24, 2015).
"IxVM: Validating Virtualized Assets and Environments," Ixia, Data Sheet, pp. 1-8 (Jun. 2015).
Notification of Transmittal of the International Search Report and the Written Opinion of the International Searching Authority, or the Declaration for PCT International Application No. PCT/US2014/045658 (Oct. 30, 2014).
Notification of Transmittal of the International Search Report and the Written Opinion of the International Searching Authority, or the Declaration for PCT International Application No. PCT/US2014/031637 (dated Jul. 31, 2014).
"Fisher-Yates Shuffle," http://en.wikipedia.org/wiki/Fisher-Yates_shuffle, pp. 1-11 (May 8, 2014).
"IxLoad: Specifications," https://web.archive.org/web/20130901094417/http://www.ixiacom.com/products/network_test/applications/ixload/specifications/index php, pp. 1-5 (Sep. 1, 2013).
"ImpairNetTM—EIM1G4S, EIM10G4S, and EIM40G2Q Ethernet Impairment Load Module," pp. 1-5 (Jul. 2013).
"IxLoad" Ixia, Solution Brief, pp. 1-4 (Feb. 2012).
Martigoni et al., "Testing System Virtual Machines," ISSTA'10, pp. 1-11 (2010).
Liu et al., "Live Migration of Virtual Machine Based on Full System Trace and Replay," Services Computing Technology and System Lab, Huazhong University of Science and Technology, pp. 101-110 (2009).
Sommers and Barford, "Self-Configuring Network Traffic Generation", IMC'04, pp. 1-14 (Oct. 25-27, 2004).
Office Action for Japanese Patent Application Serial No. 2007-286683 (dated Feb. 22, 2010).
"Automatic test tools for Nikkawa Yasuno 3, C/S system: Nikkei Open System No. 40, Nikkei BP.", pp. 247 to 257 (Jul. 15, 1996).
Notice of Allowance and Fee(s) Due and Interview Summary for U.S. Appl. No. 10/831,452 (dated Oct. 7, 2009).
Interview Summary for U.S. Appl. No. 10/831,452 (dated Jul. 10, 2009).
Final Office Action for U.S. Appl. No. 10/831,452 (dated May 4, 2009).
Non-Final Office Action for U.S. Appl. No. 10/831,452 (dated Jan. 22, 2009).

(56) References Cited

OTHER PUBLICATIONS

Non-Final Office Action for U.S. Appl. No. 10/831,452 (dated Jul. 25, 2008).
Non-Final Office Action for U.S. Appl. No. 10/831,452 (dated Jan. 8, 2008).
Supplementary Partial European Search Report for European Application Serial No. 02 78 0398 (dated Jan. 22, 2007).
Zec et al., "Real-Time IP Network Simulation at Gigabit Data Rates," Rensselaer Polytechnic Institute, pp. 1-8 (Mar. 2003).
Ye et al., "Network Management and Control Using Collaborative On-line Simulation," Rensselaer Polytechnic Institute, pp. 1-8 (2003).
Ye et al., "Large-Scale Network Parameter Configuration Using an On-line Simulation Framework," Technical report, ECSE Department, Rensselaer Polytechnic Institute, pp. 1-19 (2002).
Comer, "Internetworking with TCP/IP Principles, Protocols and Architectures," Prentice Hall, 4th Edition, Chapter 7 (pp. 95-113), Chapter 13 (pp. 197-249), Chapter 32 (pp. 581-597) (Jan. 2000).
"IxExplorer User's Guide," Ixia Communications, Inc., Revision 2.1.0, 384 pages (Nov. 1, 1999).
Marchette, "A Statistical Method for Profiling Network Traffic," USENIX, 11 pages (Apr. 1999).
Cooper et al., "Session Traces: An Enhancement to Network Simulator," Performance, Computing and Communications Conference, Scottsdale, AZ, 5 pages (Feb. 10, 1999).
Li et al., "SMAQ: A Measurement-Based Tool for Traffic Modeling and Queuing Analysis Part I: Design Methodologies and Software Architecture," IEEE Communications Magazine, pp. 56-65 (Aug. 1998).
Li et al., "SMAQ: A Measurement-Based Tool for Traffic Modeling and Queuing Analysis Part II: Network Applications," IEEE Communications Magazine, pp. 66-77 (Aug. 1998).
Danzig et al., "tcplib: A Library of TCP Internetwork Traffic Characteristics," USC-CS-91-495, pp. 1-8 (Jan. 1999).
Tannenbaum, "Data Transmission in the OSI Model," Computer Networks, Prentice Hall, 3rd Edition, pp. 34-35 (Mar. 1996).
Stevens, "TCP/IP Illustrated, vol. 1: The Protocols," Addison-Wesley, pp. 1-7, 21-23, 85-96 (Jan. 31, 1994).
Office Action for Japanese Patent Application Serial No. 2007-286683 (dated Mar. 2, 2010).
Office Action for Japanese Patent Application Serial No. 2007-286683 (dated Jul. 27, 2010).
Advisory Action, Examiner-Initiate Interview Summary, and AFCP 2.0 Decision for U.S. Appl. No. 16/039,283 (dated Mar. 30, 2021).
Communication under Rule 71(3) EPC Intention to Grant for European Patent Application Serial No. 16 864 727.9 (dated Feb. 18, 2021).
Notice of Allowance and Fee(s) Due for U.S. Appl. No. 17/067,627 (dated Oct. 22, 2021).
Commonly-Assigned, co-pending U.S. Appl. No. 17/498,723 for "Methods, Systems, and Computer Readable Media for Recycling Background Traffic in a Test Environment," (Unpublished, filed Oct. 11, 2021).
Tos et al., "Adaptive RTP Rate Control Method," 2011 35th IEEE Annual Computer Software and Applications Conference Workshops, pp. 1-6 (2011).
Mittal et al., "Dynamic Simulation Control with Queue Visualization," Summer Computer Simulation Conference, pp. 1-7 (Jun. 2005).
Notification of the Decision to Grant a Patent Right for Patent for Invention for Chinese Patent Application Serial No. 201680065423.9 (dated Oct. 11, 2021).
Non-Final Office Action for U.S. Appl. No. 17/198,870 (dated Sep. 17, 2021).
Notice of Allowance and Fee(s) Due for U.S. Appl. No. 17/067,627 (dated Aug. 20, 2021).
Final Office Action for U.S. Appl. No. 17/069,768 (dated Jul. 9, 2021).
Commonly-Assigned, co-pending U.S. Appl. No. 17/067,627 for "Methods, Systems, and Computer Readable Media for Network Testing Using Switch Emulation," (Unpublished, filed Oct. 9, 2020).
Zhang et al., "HyperV: A High Performance Hypervisor for Virtualization of the Programmable Data Plane," 2017 26th International Conference on Computer Communication and Networks (ICCCN), pp. 1-9 (2017).
Cziva et al., "High-Performance Virtualized SDN Switches for Experimental Network Testbeds," SI:SC16—INDIS, pp. 1-14 (Nov. 8, 2016).
Khalidi, "SONiC: The networking switch software that powers the Microsoft Global Cloud," Blog(/en-us/blog/) Cloud Strategy, pp. 1-10 (Mar. 8, 2017).
Siron, "What is the Hyper-V Virtual Switch and How Does it Work?" Altaro, pp. 1-22 (Sep. 26, 2019).
Han et al., "Virtualization in Programmable Data Plane: A Survey and Open Challenges," IEEE Open Journal of the Communications Society, pp. 1-7 (2020).
"Networking/SAI," Open Compute, pp. 1-6 (Oct. 2020).
Zhou et al., "HyperTester: High-performance Network Testing Driven by Programmable Switches," In The 15th International Conference on emerging Networking Experiments and Technologies (CoNEXT '19), pp. 1-14 (Dec. 9-12, 2019).
Spirent Communications, "Cloud Computing Testing," pp. 1-10 (Apr. 2010).
Byagowi, A., et al., "Bringing the F16 Network into the Lab," OCP Global Summit, pp. 1-16 (Jan. 29, 2021).
Zhang, C., et al., "MPVisor: A Modular Programmable Data Plane Hypervisor," SOSR, pp. 1-2 (Apr. 3-4, 2017).
Non-Final Office Action for U.S. Appl. No. 16/039,283 (Jul. 22, 2021).
Decision to grant a European patent pursuant to Article 97(1) EPC for European U.S. Appl. No. 16/864,727 9 (dated Jul. 1, 2021).
Office Action for Chinese Patent Application Serial No. 2021051802456380 (dated May 21, 2021).
Giotis et al., "Policy-based Orchestration of NFV Services in Software-Defined Networks," IEEE, pp. 1-5 (2015).
Xia et al., "Resource Optimization for Service Chain Monitoring in Software-Defined Networks," Fourth European Workshop on Software Defined Networks, IEEE, pp. 1-6 (2015).
Intention to Grant under Section 18(4) for Great Britain Application Serial No. 1817757.6 (dated Aug. 18, 2021).
Examination Report for Great Britain Application Serial No. GB1817757.6 (dated May 28, 2021).
Notice of Allowance and Fee(s) Due for U.S. Appl. No. 17/162,620 dated Jun. 23, 2022).
"TekExpress USB 3.0 (USB-RMT) Automated Receiver Compliance and Margin Test Solutions," Tektronix, pp. 1-154 (2021).
"QSFP DD Loopback Modules," High Speed IO, Amphenol ICC, pp. 1-2 (2021).
Sultana et al., "Flightplan Dataplane Disaggregation and Placement for P4 Programs," 18th {USENIX} Symposium on Networked Systems Design and Implementation, pp. 1-22 (2021).
"Spirent Network Emulator," Spirent Communications, pp. 1-11 (Apr. 2021).
"Ethernet Network Emulator," MGA2510 Product Brief, Aukua Systems, pp. 1-2 (2021).
"Chimera Network Impairment Emulator," Xena Networks, pp. 1-2 (2021).
Commonly-Assigned, co-pending U.S. Appl. No. 17/542,011 for "Methods, Systems, and Computer Readable Media for Providing Adaptive Background Test Traffic in a Test Environment." (Unpublished, filed Dec. 3, 2021).
"Network Emulator II—Ethernet 10GE, 1GE, and 100MbE Ethernet Impairment Emulation," Keysight Technologies, pp. 1-8 (Oct. 22, 2020).
Cao et al., "TurboNet: Faithfully Emulating Networks with Programmable Switches," IEEE, pp. 1-11 (2020).
"Datasheet—Albedo NetStorm," Albedo Telecom, pp. 1-2 (Dec. 23, 2015).
"Albedo Net.Storm," NETSTORM.en, pp. 1-4 (2014).

(56) References Cited

OTHER PUBLICATIONS

"The Value of Network Impairment Testing in Power Grids," Calnex SNE, pp. 1-2 (2006).

Notice of Allowance and Fee(s) Due for U.S. Appl. No. 17/198,870 (dated Mar. 24, 2022).

Notice of Allowance and Fee(s) Due for U.S. Appl. No. 17/067,627 (dated Feb. 8, 2022).

Notice of Allowance and Fee(s) Due for U.S. Appl. No. 17/217,920 (dated Jan. 14, 2022).

"Agilent E4219A ATM Network Impairment Emulator," Keysight, pp. 1-5 (2021).

"INE Network Emulator Appliance," Technical Specifications, pp. 1-2 (2018).

Notice of Allowance for U.S. Appl. No. 16/039,283 (dated Mar. 9, 2022).

Notice of Allowance and Fee(s) Due for U.S. Appl. No. 17/217,920 (dated Mar. 4, 2022).

Notice of Allowance and Fee(s) Due for U.S. Appl. No. 17/162,620 (dated Jul. 13, 2022).

\* cited by examiner

METHODS, SYSTEMS AND COMPUTER READABLE MEDIA FOR ACTIVE QUEUE MANAGEMENT

TECHNICAL FIELD

The subject matter described herein relates to network testing. More particularly, the subject matter described herein relates to methods, systems, and computer readable media for active queue management.

BACKGROUND

Network operators typically test network nodes for reliability and other characteristics before deploying the network nodes to production environments (e.g., non-test environments). Generally, it is important to test networks nodes with various amounts of traffic and different types of traffic. For example, a test platform, such as an IxNetwork™ platform manufactured by Keysight, may be usable for network topology testing and traffic analysis and may generate test traffic for testing various network nodes using one or more protocols.

Data centers may be a term for distributed systems (e.g., multiple servers, switches, and/or other devices in same building) used for performing various functions. Within a data center, traffic can be significantly impacted by network switches and their related components. For example, queue related logic during heavy traffic periods can affect when and how traffic congestion is managed and/or can significantly impact system performance.

Issues can arise when testing a network switch center or a related queue. In particular, it may require significant time and testing resources to effectively test network switch queues and related logic during congestion events associated with various traffic scenarios, especially scenarios involving test and non-test traffic.

SUMMARY

The subject matter described herein includes methods, systems, and computer readable media for active queue management. A method for active queue management occurs at a network test system (NTS). The method includes transmitting, by a test packet generator and during a test session, a test packet to a system under test (SUT); receiving queue performance information associated with a queue related to the test packet; generating, utilizing the queue performance information, control signaling information usable for controlling the test packet generator; and controlling the test packet generator using the control signaling information.

A system for active queue management includes an NTS implemented using at least one processor. The NTS is configured for: transmitting, by a test packet generator and during a test session, a test packet to a SUT; receiving queue performance information associated with a queue related to the test packet; generating, utilizing the queue performance information, control signaling information usable for controlling the test packet generator; and controlling the test packet generator using the control signaling information. The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

In accordance with some aspects of the subject matter described herein, techniques, systems, methods, or mechanisms for active queue management are provided. For example, a network test system or a related entity in accordance with aspects described herein may be configured to test a network switch or other node with one or more network traffic related queues by using a servo or feedback controller to adjust a rate of test traffic being generated and sent to a system under test (SUT). In this example, the servo or feedback controller may utilize queue performance information (e.g., queue depth or utilization information, latency information, processing throughput information, and/or dropped packet counts) associated with a SUT queue, e.g., via in-band telemetry, an application programming interface (API), a test agent at the SUT, and/or other another entity.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
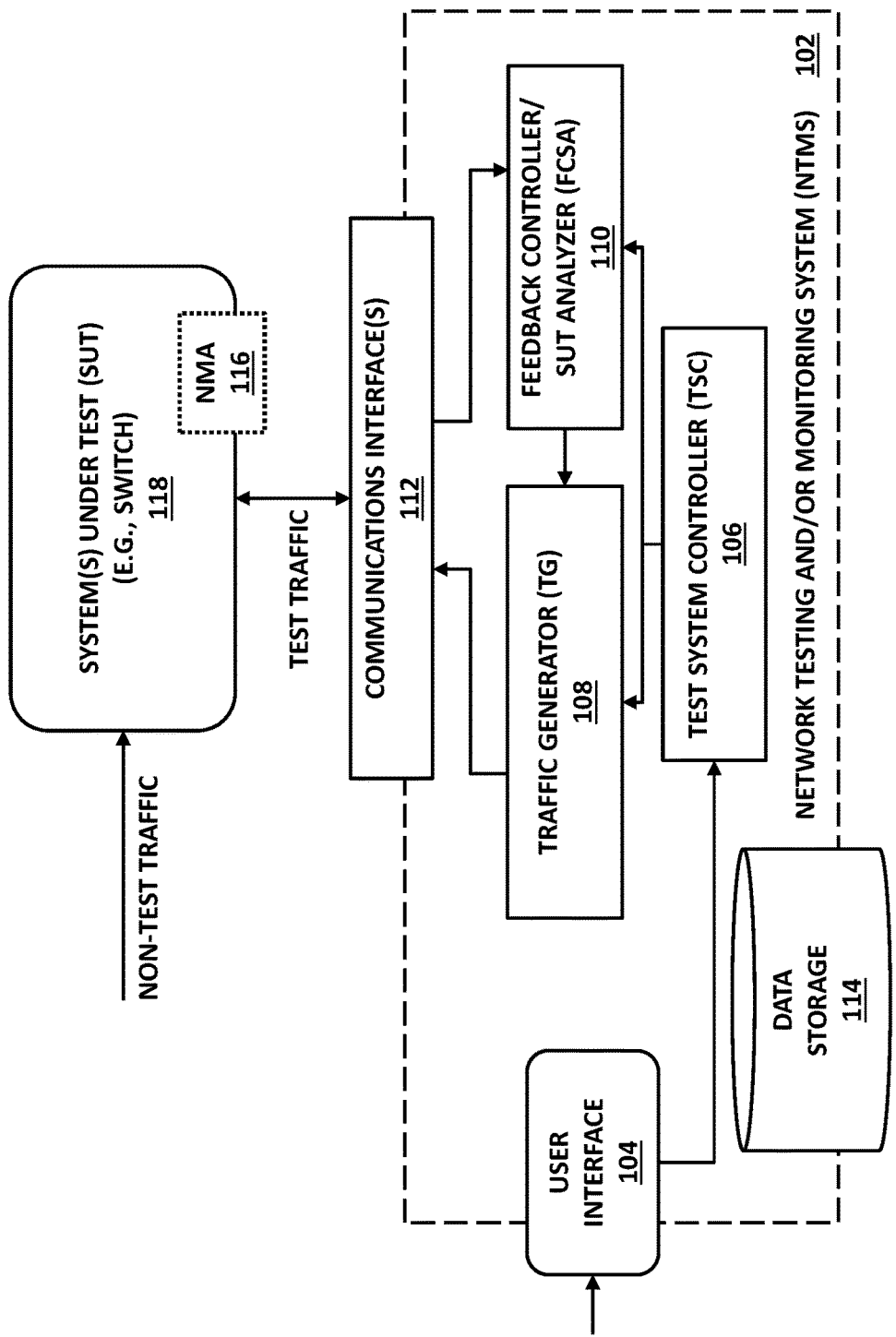
FIG. 1 is a block diagram illustrating an example environment for active queue management.

FIG. 1 is a diagram illustrating an example environment 100 for active queue management. Referring to FIG. 1, environment 100 may include a network testing system (NTS) 102 for performing various monitoring and/or testing operations. For example, NTS 102 may represent any suitable entity or entities (e.g., one or more testing platforms, nodes, or devices) associated with monitoring and/or testing one or more system(s) under testing (SUT) 118. In some embodiments, NTS 102 may include network monitoring and/or related analysis functionality.

In some embodiments, NTS 102 may include feedback controlled testing functionality. For example, NTS 102 or a related entity may generate and send test traffic (e.g., background traffic) to SUT 118 or related SUT queues during a test session. In this example, during the test session NTS 102 may obtain queue performance information and may use the queue performance information to generate control signaling information for dynamically or periodically adjusting or modifying aspects of testing, e.g., by reducing or increasing test traffic or by changing the makeup of the test traffic. Continuing with this example, NTS 102 or a related entity may monitor performance of SUT 118 and/or related SUT queues during the test session to evaluate various SUT performance aspects, e.g., programmability for queue related functionality, queue allocation logic, packet discard logic, and/or congestion related mechanisms.

In some embodiments, NTS 102 may perform testing of SUT 118 in various types of environments or scenarios. For example, NTS 102 may perform testing of SUT 118 in open-loop scenarios where SUT 118 receives test traffic and non-test traffic (e.g., production traffic from a live network). In another example, NTS 102 may perform testing of SUT 118 in a closed-loop scenarios where SUT 118 receives test traffic but no non-test traffic.

In some embodiments, NTS 102 may be a stand-alone tool, an in-line device, a testing device, a testing platform, a network tap, or software executing on at least one processor. In some embodiments, NTS 102 may be a single node or may be distributed across multiple computing platforms or nodes.

NTS 102 may include a user interface 104, a test system controller (TSC) 106, a traffic generator (TG) 108, a feedback controller and/or SUT analyzer (FCSA) 110, one or more communications interface(s) 112, a data stor age 114, and/or one or more network monitoring agents (NMAs), e.g., NMA 116.

In some embodiments, NTS 102 may provide user interface 104 for communicating with a test operator and/or another entity. For example, an analysis operator may represent any entity (e.g., an automated system or a device or system controlled or controllable by a human user) for selecting and/or configuring various aspects associated with configuring and/or executing one or more tests or for analyzing observed network information. For example, user interface 104, e.g., an application user programming interface (API) and a graphical user interface (GUI), may allow a user (e.g., a human or computer system) to provide and/or modify configuration information, such as test settings, SUT related information, network traffic latency emulation metrics, feedback control algorithms, traffic patterns, service emulation settings, etc. In some embodiments, user interface 104 may support automation (e.g., via one or more scripting languages), a representational state transfer (REST) or other API, a command line, and/or a web-based GUI.

TSC 106 may represent any suitable entity or entities (e.g., software executing on a processor, a field-programmable gateway array (FPGA), and/or an ASIC, or a combination of software, an FPGA, and/or an ASIC) for performing one or more aspects associated with testing SUT 118, controlling or configuring a test session or test system entities, and/or various aspects thereof. In some embodiments, TSC 106 may be implemented using one or more processors and/or memory. For example, TSC 106 may utilize one or more processors (e.g., executing software stored in memory) to generate traffic patterns or scenarios for various message streams (e.g., flows or sessions). In another example, TSC 106 may also utilize one or more processors to perform or initiate various tests and/or analyses involving test packets and/or related responses from SUT 118. In this example, TSC 106 may send instructions to various modules or entities, e.g., testing applications, TG 108, FCSA 110, and/or NMA 116, in NTS 102 for controlling (e.g., to pause, (re)start, or stop) a test session.

TG 108 may represent any suitable entity or entities (e.g., software executing on a processor, an ASIC, an FPGA, or a combination of software, an ASIC, or an FPGA) for performing one or more aspects associated with generating or synthesizing test sessions, test cases, or related test packets. For example, TG 108 may receive user input (e.g., a test intent or objective, like a test scenario declaration) via user interface 104 to obtain user intent or other information about a test case. In this example, TG 108 may use the user input and predefined test case templates or related data to generate one or more test cases and/or test sessions.

In some embodiments, TG 108 or a related entity may generate and/or use one or more test case templates or related test flows based on observed or predefined traffic patterns. For example, live intra-data center traffic flows may be monitored and captured (e.g., entire packets and/or flows may be captured, packet and/or flow meta data may be captured, etc.) and used, at least in part, to construct a traffic model that can be used to test SUT 118 or SUT queues therein. In this example, TG 108 or a related entity may also use topology information obtained from analysis of the observed traffic data and/or may be provisioned by a test operator or other entity.

FCSA 110 may represent any suitable entity (e.g., a servo implemented using a CPU or in a programmable datapath) or entities (e.g., software executing on a processor, an ASIC, an FPGA, or a combination of software, an ASIC, or an FPGA) for performing one or more aspects associated with analyzing queue performance information related to SUT 118 and/or for determining control signaling information for adjusting one or more aspects of TG 108.

In some embodiments, FCSA 110 may receive queue performance information from SUT 118 (e.g., in-band telemetry information and/or by reading ASIC registers out-of-band) and/or NMA 116. In this example, FCSA 110 may execute a feedback control algorithm (e.g., discrete-time control loop technique) that utilizes the queue performance information to generate control signaling information. Continuing with this example, the control signaling information may be utilized in controlling TG 108 for achieving a desired SUT state indicative of various SUT related metrics or values.

In some embodiments, a desired SUT state can represent one or more steady-state condition(s) or one or more time-varying condition(s). For example, during a test session for simulating well-known diurnal patterns of traffic congestion, a desired SUT state may be represented by conditions (e.g., queue depth values or packet drop counts) that vary or change over a particular time period. In this example, during the test session, FCSA 110 may periodically or dynamically generate control signaling information for controlling TG 108 or a related entity to generate and send test traffic to achieve or attempt to achieve the current desired SUT state.

In some embodiments, a feedback control algorithm may involve computing an error term, e.g., desired SUT state—actual (e.g., monitored or derived) SUT state), based at least in part on queue performance information associated with SUT 118. Continuing with this example, the feedback control algorithm may use the error term to identify various changes or adjustments (e.g., adjusting a traffic generation rate) needed to TG 108 for achieving the desired SUT state and may generate control signaling information for enacting these changes or adjustments at TG 108, e.g., by adjusting a traffic generation rate of TG 108.

In some embodiments involving open-loop scenarios, adjustments or changes to test traffic generation may consider a derived traffic rate associated with non-test traffic. For example, FCSA 110 may compute a derived non-test traffic rate by subtracting a known test traffic rate from a monitored total traffic rate at SUT 118 or a SUT queue therein. In this example, FCSA 110 may use the derived non-test traffic rate when determining control signaling information for adjusting or changing aspects of test traffic generation for achieving or attempting to achieve a set of desired SUT state characteristics.

In some embodiments involving closed-loop scenarios, adjustments or changes to test traffic generation may consider a known and/or a monitored test traffic rate associated with generated test traffic. For example, FCSA 110 may compute a derived SUT traffic rate by averaging a known test traffic rate and a monitored traffic rate at SUT 118 or a SUT queue therein. In this example, FCSA 110 may use the derived SUT traffic rate when determining control signaling information for adjusting or changing aspects of test traffic generation for achieving or attempting to achieve a set of desired SUT state characteristics. In another example, FCSA 110 may use the known test traffic rate or the monitored traffic rate when determining control signaling information for adjusting or changing aspects of test traffic generation for achieving or attempting to achieve a set of desired SUT state characteristics.

Communications interface(s) 112 may include or utilize any suitable entity or entities (e.g., one or more network interface cards (NICs), physical processors, pluggable jacks, physical processors, transceiver modules, direct-attach cables (DACs) and/or other hardware) for sending or receiving communications. For example, NTS 102 or FCSA 110 may use one or more communications interface(s) 112 for receiving and sending test packets, configuration instructions, observed traffic, queue performance information, or other data.

In some embodiments, communications interface(s) 112 may send or receive IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, communications interface(s) 112 may include multiple port modules for interacting with SUT 118 and/or NMA 116. In some examples, a port module may include one or more transmit ports for sending test packets to SUT 118 or a queue thereof and one or more receive ports for receiving test packets back from SUT 118 or a queue thereof. In some examples, a port module may include one or more transmit ports for sending information to one or more SUT queues and one or more receive ports for receiving information from one or more SUT queues. In some examples, each port module or port(s) thereof may be assigned to a particular application, service, test flow, and/or IP address and port or for handling communications associated with a particular function or role.

NTS 102 and/or related entities may include functionality for accessing data storage 114. Data storage 114 may represent any suitable entity or entities (e.g., a storage device, a non-transitory computer readable medium, or a storage system) for maintaining or storing information related to testing and/or related metrics. For example, data storage 114 may contain simulated test traffic, test cases, test session data, configuration settings, historical test session data, feedback control logic, performance metrics (e.g., statistics), and/or other information usable for generating control signaling information for controlling TG 108 or other aspects of testing, e.g., adjusting a test traffic rate or changing makeup of test traffic. In some embodiments, data storage 114 may be located at NTS 102, FCSA 110, another node, or distributed across multiple platforms or devices.

SUT 118 may represent any suitable entity or entities (e.g., devices, systems, or platforms) for communicating with NTS 102 or related entities and/or receiving, processing, forwarding, and/or sending test traffic, non-test traffic, or other data. For example, SUT 118 may include a network router, a network switch, a traffic forwarding device, a NIC, a network node or related hardware containing one or more traffic related data queues (e.g., data structures for handling ingress or egress packets or frames). In another example, SUT 118 may include one or more systems and/or computing platforms, e.g., a data center or a group of servers and/or switches connected via a network.

In some embodiments, SUT 118 may represent one or more transit nodes (e.g., network switches) that are INT capable and/or can provide queue performance information, e.g., queue depth or utilization information, latency information, processing throughput information, and/or dropped packet counts. For example, SUT 118 may be configured for detecting INT instructions in packet headers or payloads and may insert into the packets INT metadata corresponding to the INT instructions. Example INT metadata may include a switch or node identifier (ID), ingress information (e.g., an ingress port ID, an ingress timestamp, etc.), egress information (e.g., an egress port ID, an egress timestamp, a hop latency, an egress port transmit link utilization value, etc.), buffer information (e.g., queue occupancy, queue congestion status, etc.), and/or other device related information. In some embodiments, INT metadata or other telemetry information may be stored in any portion of a packet, including, for example, a header, a payload, or a combination thereof. Additional details regarding INT is found in "In-band Network Telemetry (INT)" by Kim et al. (June 2016); the disclosure of which is incorporated herein by reference in its entirety. In another example, SUT 118 may provide an API or another mechanism for providing queue performance information, e.g., via in-band or out-of-band.

NMA 116 may represent any suitable entity or entities (e.g., software executing on a processor, an ASIC, an FPGA, or a combination of software, an ASIC, or an FPGA) for monitoring and/or providing performance related information about SUT 118 or related SUT queues. For example, NMA 116 may be configured to sniff traffic, filter, and/or classify traffic, and record metadata and precise timestamps for relevant packets. In this example, NMA 116 may capture entire packets or portions therein, e.g., headers, parameters, particular attribute value pairs (AVPs), payload portions, etc. In another example, NMA 116 may be capable of reading queue performance information from via an internal API or another mechanism. In another example, NMA 116 may be configured to include INT metadata containing queue performance information.

In some embodiments, NTS 102 and/or related entities may test SUT 118 or queues therein for determining queue related performance aspects before, during, and/or after a congestion event. For example, NTS 102 may test an internal processing queue associated with SUT 118 in an open-loop scenario, e.g., where SUT 118 or the processing queue is concurrently receiving some test traffic and some production (e.g., non-test) traffic. In this example, when uncongested, no packets from either the production or test packet flows may be dropped from the processing queue associated with SUT 118 due to queue saturation or overflow. However, when congested, the processing queue may fill completely and overflow, thereby causing packets to be dropped or discarded. In both scenarios, performance of the queue may be measured via various metrics, e.g., cross-switch latency times and queue depth levels.

In some embodiments, NTS 102 and/or related entities may perform traffic engineering when testing and evaluating performance aspects of SUT 118 or related queues. For example, in an open-loop scenario and prior to sending test traffic, NTS 102 may monitor SUT 118 to establish a baseline for performance aspects of an internal processing queue associated with SUT 118. In this example, after determining a performance baseline, NTS 102 and/or related entities may configure a queue, a port, a port group, and/or an ECMP group for rated traffic throughput and queueing allocations, may calculate background traffic mixes to produce the desired emulation of datacenter workloads which compete concurrently with a production workload of interest; and may systematically or dynamically vary the background traffic while monitoring the corresponding performance of SUT 118 along with the impact that the background traffic has on the production traffic transiting SUT 118, e.g., relative to the determined performance baseline.

In some embodiments, NTS 102 and/or related entities may test SUT 118 or queues therein using injection rates and drain rates. For example, prior to testing SUT 118 or a related queue, NTS 102 may be aware (e.g., from baseline testing or test operator input) of a drain rate (e.g., how quickly packets are removed from a queue) associated with an internal processing queue associated with SUT 118. In this example, NTS 102 may be aware (e.g., from baseline testing or test operator input) of an injection rate (e.g., how quickly packets are added to a queue and which may be strongly correlated to test traffic generation rate) associated with the internal processing queue associated with SUT 118. After determining these queue related rates, NTS 102 and/or related entities may configure a queue, a port, a port group, and/or an ECMP group for rated traffic throughput and queueing allocations and then send test traffic at a configured steady state test traffic rate for yielding an injection rate equivalent to the known drain rate such that a SUT queue maintains consistent queue occupancy, e.g., if the SUT queue was initially empty, then the SUT queue will maintain at most a fractional packet in it.

In some embodiments where test sessions are configured to utilize test traffic rates that yield an injection rate equivalent to a known drain rate, NTS 102 and/or related entities (e.g., TG 108) may send a batch or burst of extra packets as an "adjustment" event (e.g., higher than the steady state injection rate) which should raise the average depth level of the queue assuming the queue drains at a precise drain rate.

In some embodiments where test sessions utilize test traffic rates that yield an injection rate equivalent to a known drain rate, NTS 102 and/or related entities (e.g., TG 108) may send fewer packets as an "adjustment" event (e.g., lower than the steady state injection rate) which should reduce the average depth level of the queue assuming the queue drains at a precise drain rate.

It will be appreciated that FIG. 1 is for illustrative purposes and that various nodes and/or modules, locations, and/or functionality described above in relation to FIG. 1 may be changed, altered, added, or removed.

Figure 2:
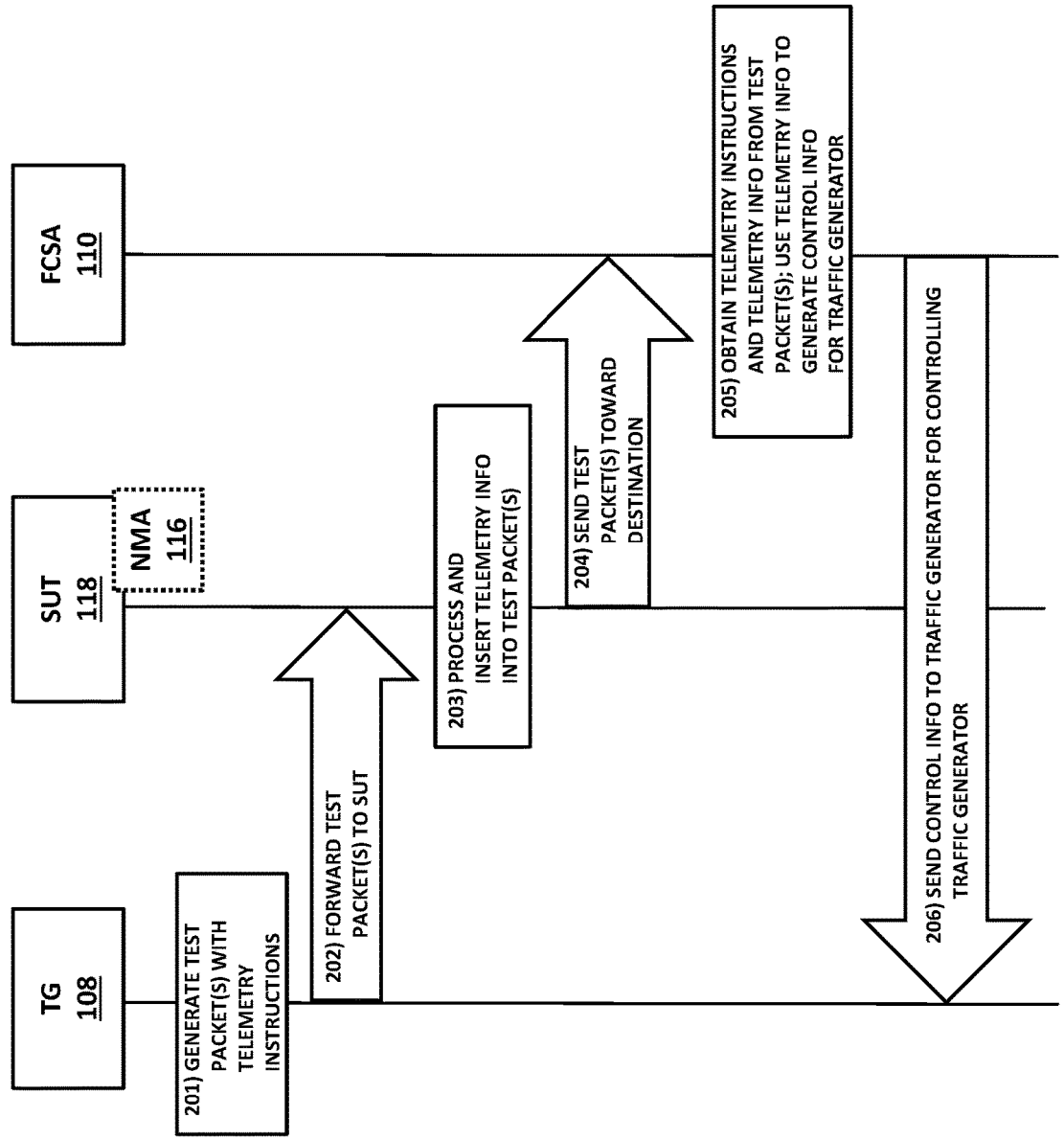
FIG. 2 is a message flow diagram illustrating an example in-band process associated with active queue management.

FIG. 2 is a message flow diagram illustrating an example in-band process 200 associated with active queue management. In some embodiments, SUT 118 may be configured to allow NTS 102 or a related entity to access or obtain queue performance information via one or more in-band processes or techniques (e.g., by adding or appending queue performance information to at least some packets that traverses SUT 118).

In some embodiments, accessing or obtaining queue performance information using an in-band process may not require communicating with one or more NMAs (e.g., NMA 116) deployed within SUT 118 and/or the surrounding testing environment. For example, SUT 118 may support one or more telemetry protocols that can be utilized by NTS 102 or another entity, e.g., FCSA 110.

In some embodiments, accessing or obtaining queue performance information using an in-band process may involve communicating with one or more NMAs (e.g., NMA 116) deployed within SUT 118 and/or the surrounding testing environment. For example, NMA 116 may be used in environments where SUT 118 does not support INT or does not support other in-band techniques for obtaining queue performance information.

In some embodiments, an NMA may be deployed in-line between NTS 102 and SUT 118 and act as an telemetry source (e.g., an entity that inserts INT headers, trailers, payloads, or other information to trigger INT metadata collection), while another NMA (e.g., NMA 116) may be deployed at or near SUT 118 and act as an telemetry sink (e.g., an entity that removes INT headers or trailers and INT metadata so as to make INT transparent to other layers or entities).

In some embodiments, during a test session or set of test sessions, FCSA 110 (e.g., a servo or feedback sub-system) may dynamically or periodically modify test traffic generation characteristics at TG 108 for achieving or attempting to achieve a set of desired SUT state characteristics. For example, desired SUT state characteristics may include an average queue depth for one or more of SUT queues; a workload latency value associated with one or more of SUT queues, a drop rate associated with one or more of SUT queues, a traffic or packet throughput value associated with one or more of SUT queues, etc.

Referring to FIG. 2, in step 201, TG 108 or a related entity may generate one or more test packets with telemetry instructions (e.g., in an INT header, a trailer, a payload, or one or more portions of a packet or frame) for triggering SUT 118 (e.g., a network switch) to collect and store telemetry information (e.g., INT metadata) associated with a SUT queue in at least some of the test packets as they transit SUT 118.

In step 202, NTS 102 or a related entity may send or forward the test packets to SUT 118.

In step 203, SUT 118 or a related entity (e.g., NMA 116) may receive the test packets, detect the telemetry instructions, and, in response to the telemetry instructions, insert telemetry information into the test packets. In some embodiments, inserted telemetry information may indicate various queue performance metrics or related data associated with one or more SUT queues.

In step 204, SUT 118 or a related entity may send or forward the test packets containing the telemetry information toward a destination (e.g., NTS 102 or FCSA 110).

In step 205, FCSA 110 or a related entity may receive the modified packets and extract the telemetry information. In some embodiments, NTS 102 or FCSA 110 may use the telemetry information for generating control signaling information to control TG 108 (e.g., by reducing or increasing a test traffic generation rate in an attempt to reach a desire level or depth at one or more queues of SUT 118 or by adjusting a test traffic pattern) and/or for other purposes. In some embodiments, FCSA 110 may strip or remove telemetry related information from the packets and then forward the "stripped" packets to another destination.

In some embodiments, test system traffic generation rates or other aspects of TG 108 may be controlled by FCSA 110 or a related feedback loop (servo) sub-system. For example, NTS 102 or a related entity (e.g., TSC 106) using operator input may set or define ideal or desired SUT queue state characteristics during a test session. In this example, FCSA 110 may dynamically or periodically during a test session or set of test session may compute an error term (e.g., desired SUT state—actual (e.g., monitored or derived) SUT state), based at least in part on the received telemetry information. Continuing with this example, FCSA 110 may use the error term, a predetermined table of possible adjustments and probable effects, classical discrete-time control-loop computations (e.g., a proportional-integral-derivative (PID) controller algorithm or other arbitrarily complex algorithms) and/or prediction logic to determine various changes or adjustments (e.g., adjusting a traffic generation rate) needed to TG 108 for achieving the desired SUT state, which may be outputted as or converted to control signaling information for enacting these changes or adjustments at TG 108.

In step 206, FCSA 110 or a related entity may send control signaling information to TG 108 for controlling TG 108. For example, control signaling information may trigger TG 108 to adjust a current test traffic generation rate during a test session. In another example, control signaling information may trigger TG 108 to adjust types of test packets generated, test traffic patterns, and/or traffic related characteristics (e.g., destination port numbers and/or IP addresses) during a test session.

It will be appreciated that FIG. 2 is for illustrative purposes and that different and/or additional steps other than those depicted in FIG. 2 may occur. Further, it will be appreciated that some steps may occur in a different order than depicted in FIG. 2 and that functionality described above in relation to FIG. 2 may be changed, altered, added, or removed.

Figure 3:
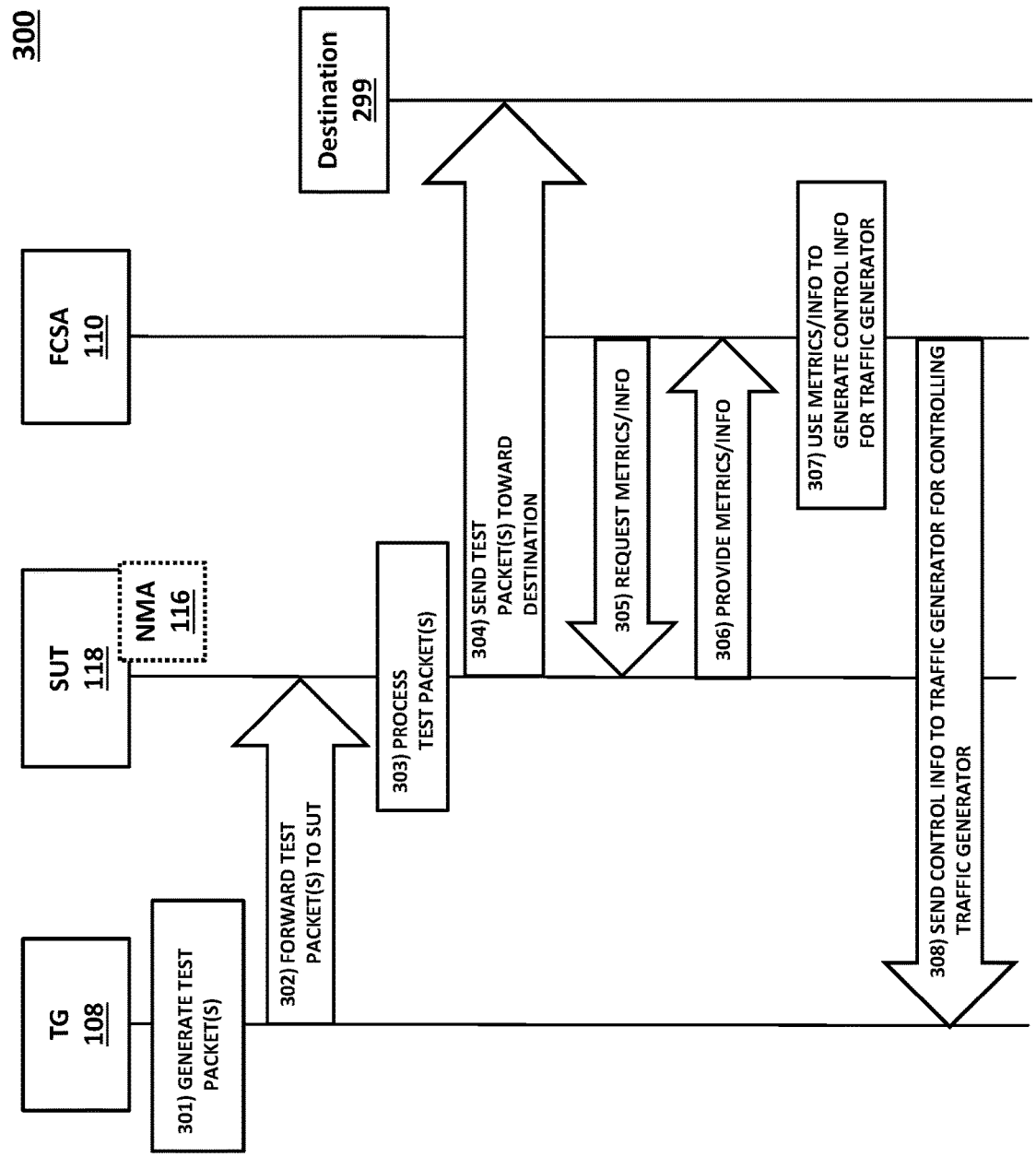
FIG. 3 is a message flow diagram illustrating an example out-of-band process associated with active queue management.

FIG. 3 is a message flow diagram illustrating an example out-of-band process 300 associated with active queue management. In some embodiments, SUT 118 may be configured to allow NTS 102 or a related entity to access or obtain queue performance information via one or more out-of-band processes or techniques (e.g., by reading ASIC registers via a CPU or in the dataplane itself or another mechanism). For example, NMA 116 may periodically read, generate, and/or provide SUT queue performance information to FCSA 110 via an out-of-band connection, e.g., outside the datapath.

In some embodiments, accessing or obtaining queue performance information using an out-of-band process may not require communicating with one or more NMAs (e.g., NMA 116) deployed within SUT 118 and/or the surrounding testing environment. For example, SUT 118 may provide a network operating system (NOS) and/or a related API that can be accessed by NTS 102 or another entity, e.g., FCSA 110.

In some embodiments, accessing or obtaining queue performance information may involve communicating with one or more NMAs (e.g., NMA 116) deployed within SUT 118 and/or the surrounding testing environment. For example, NMA 116 may be used in environments where SUT 118 or a queue therein does not have a test system accessible API or is unable to support an out-of-band technique for obtaining queue performance information.

In some embodiments, during a test session or set of test sessions, FCSA 110 (e.g., a servo or feedback sub-system) may dynamically or periodically modify test traffic generation characteristics at TG 108 for achieving or attempting to achieve a set of desired SUT state characteristics. For example, desired SUT state characteristics may include an average queue depth for one or more of SUT queues; a workload latency value associated with one or more of SUT queues, a drop rate associated with one or more of SUT queues, a traffic or packet throughput value associated with one or more of SUT queues, etc.

Referring to FIG. 3, in step 301, TG 108 or a related entity may generate one or more test packets that will be added to a queue and potentially processed at SUT 118.

In step 302, NTS 102 or a related entity may send or forward the test packets to SUT 118.

In step 303, SUT 118 or a related entity (e.g., NMA 116) may receive and process the test packets.

In step 304, SUT 118 or a related entity may send or forward the test packets toward NTS 102 or a destination 299.

In step 305, FCSA 110 or a related entity may request, e.g., via an out-of-band connection, queue performance information from SUT 118 or another entity (e.g., NMA 116).

In step 306, SUT 118 or a related entity may provide the queue performance information to FCSA 110 or a related entity.

In step 307, NTS 102 or FCSA 110 may use the queue performance information for generating control signaling information to control TG 108 (e.g., by reducing or increasing a test traffic generation rate in an attempt to reach a desire level or depth at one or more queues of SUT 118 or by adjusting a test traffic pattern) and/or for other purposes.

In some embodiments, test system traffic generation rates or other aspects of TG 108 may be controlled by FCSA 110 or a related feedback loop (servo) sub-system. For example, NTS 102 or a related entity (e.g., TSC 106) using operator input may set or define ideal or desired SUT queue state characteristics during a test session. In this example, FCSA 110 may dynamically or periodically during a test session or set of test session may compute an error term (e.g., desired SUT state—actual (e.g., monitored or derived) SUT state), based at least in part on queue performance information received via an out-of-band process. Continuing with this example, FCSA 110 may use the error term, a predetermined table of possible adjustments and probable effects, classical discrete-time control-loop computations (such as PID controller algorithm or other arbitrarily complex algorithms) and/or prediction logic to determine various changes or adjustments (e.g., adjusting a traffic generation rate) needed to TG 108 for achieving the desired SUT state, which may be outputted as or converted to control signaling information for enacting these changes or adjustments at TG 108.

In step 308, FCSA 110 or a related entity may send control signaling information to TG 108 for controlling TG 108. For example, control signaling information may trigger TG 108 to adjust a current test traffic generation rate during a test session. In another example, control signaling information may trigger TG 108 to adjust types of test packets generated, test traffic patterns, and/or traffic related characteristics (e.g., destination port numbers and/or IP addresses) during a test session.

It will be appreciated that FIG. 3 is for illustrative purposes and that different and/or additional steps other than those depicted in FIG. 3 may occur. Further, it will be appreciated that some steps may occur in a different order than depicted in FIG. 3 and that functionality described above in relation to FIG. 3 may be changed, altered, added, or removed.

Figure 4:
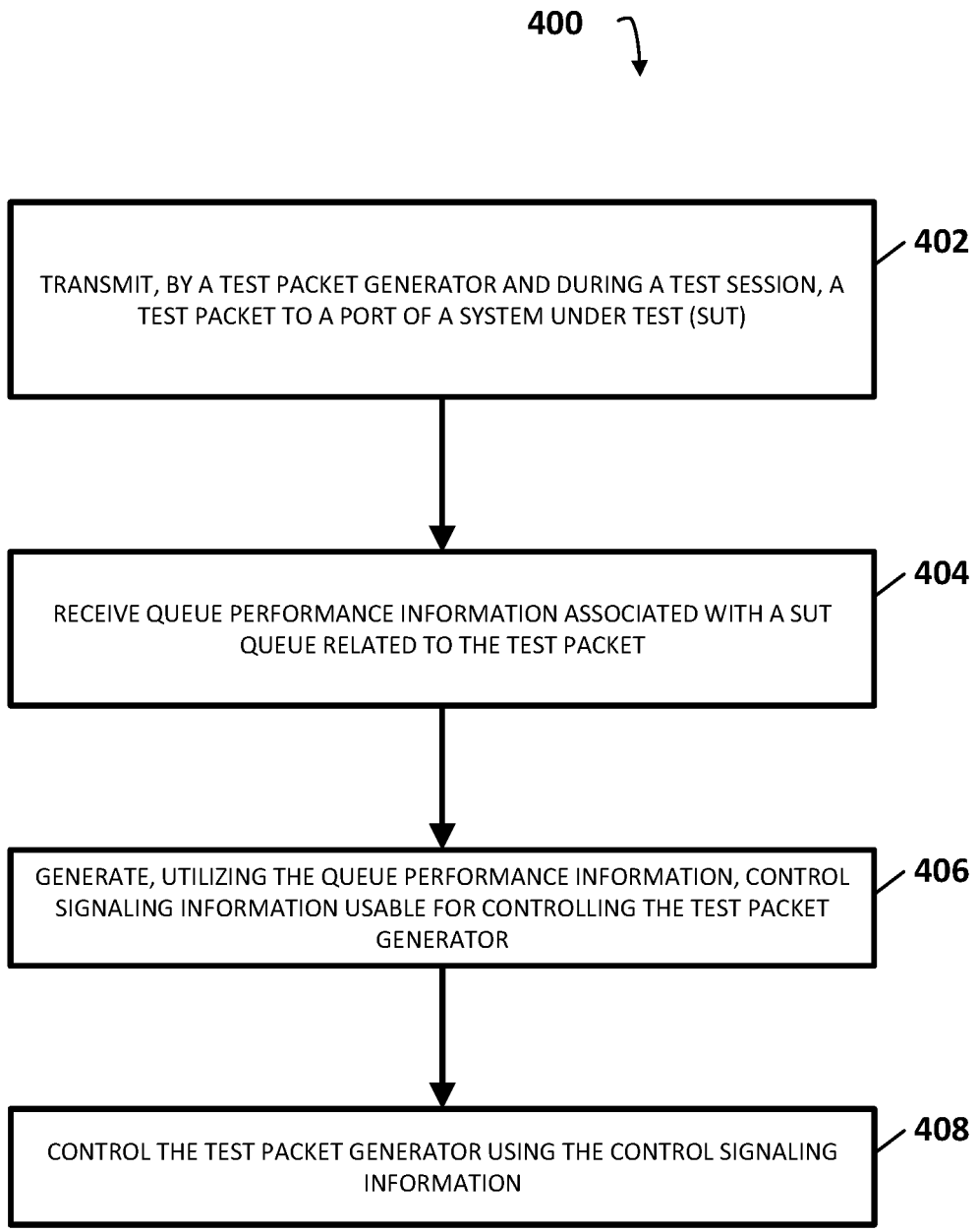
FIG. 4 is a flow chart illustrating an example process for active queue management.

FIG. 4 is a diagram illustrating an example process 400 for active queue management. In some embodiments, process 400, or portions thereof, may be performed by or at NTS 102 (e.g., a network test system) and/or another node or module. In some embodiments, process 400 may include steps 402, 404, 406, and/or 408.

Referring to process 400, in step 402, a test packet may be transmitted, by a test packet generator and during a test session, to a SUT. For example, NTS 102 may execute a test session involving TG 108 sending test traffic to SUT 118 for testing queue performance aspects of SUT 118.

In step 404, queue performance information associated with a SUT queue related to the test packet may be received. For example, queue performance information may include latency information, processing throughput information, discard or drop information, or queue utilization information.

In some embodiments, receiving queue performance information associated with a SUT queue may occur using a out-of-band process. In such embodiments, the out-of-band process may request (e.g., by FCSA 110) queue performance information associated with the SUT queue and may receive (e.g., from SUT 118, a switch API, or NMA 116) the queue performance information.

In some embodiments, receiving queue performance information associated with a SUT queue may occur using a out-of-band process. In such embodiments, the in-band process may include sending a test packet containing INT instructions for instructing SUT 118 or a related entity (e.g., NMA 116) to provide INT metadata related to the SUT queue and wherein the queue performance information may include the INT metadata provided by SUT 118 or the related entity.

In some embodiments, a SUT queue may handle traffic received on a receive port of SUT 118, traffic sent in response to the traffic received on a transmit port of SUT 118, or traffic that may be similar to the test packet. For example, a SUT queue may handle traffic associated with a port number, a port group, or an equal-cost multi-path routing (ECMP) group.

In step 406, control signaling information usable for controlling the test packet generator may be generated utilizing the queue performance information. In some embodiments, generating the control signaling information may include computing a change for the test traffic rate in an attempt to achieve a desired traffic rate at SUT 118 based on a known test traffic rate and the queue performance information.

In some embodiments, e.g., where SUT 118 also receives and processes non-test traffic during the test session (e.g., an open-loop scenario), generating the control signaling information may include computing a change for the test traffic rate in an attempt to achieve a desired traffic rate at SUT 118 based on a known test traffic rate, a derived non-test traffic rate, and the queue performance information.

In step 408, the test packet generator may be controlled using the control signaling information. For example, controlling TG 108 may include adjusting a test traffic rate during a test session and/or adjusting types or characteristics of generated test traffic during the test session.

In some embodiments, SUT 118 may include a network switch, a traffic forwarding device, a NIC, an FPGA, an ASIC, or a processor.

It will be appreciated that process 400 is for illustrative purposes and that different and/or additional actions may be used. It will also be appreciated that various actions described herein may occur in a different order or sequence.

It should be noted that NTS 102, TSC 106, TG 108, FCSA 110, and/or functionality described herein may constitute one or more special purpose computing devices. Further, NTS 102, TSC 106, TG 108, FCSA 110, and/or functionality described herein can improve the technological field of testing traffic related queues in various network nodes (e.g., network switches) by providing various techniques for active queue management. For example, NTS 102, TSC 106, TG 108, FCSA 110, and/or functionality described herein may test a network switch or other node with one or more network traffic related queues by using a servo or feedback controller to adjust a rate of test traffic being generated and sent to SUT 118. In this example, FCSA 110 may utilize queue performance information (e.g., queue depth or utilization information, latency, and/or dropped packet counts) associated with a SUT queue, e.g., via in-band telemetry, an API, NMA 116, and/or other another entity.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for active queue management, the method comprising:
    at a network test system (NTS):
        prior to a test session, determining a baseline for one or more performance metrics associated with performance of a system under test (SUT), wherein the one or more performance metrics include a drain rate associated with a SUT queue of the SUT;
        transmitting, by a test packet generator and during a test session, test packets to the SUT;
        receiving queue performance information associated with the SUT queue related to the test packets;
        generating, utilizing the queue performance information, a known test traffic rate, and the drain rate, control signaling information usable for controlling the test packet generator, wherein generating the control signaling information includes deriving a non-test traffic rate by subtracting the known test traffic rate from a monitored total traffic rate at the SUT and using the derived non-test traffic rate in generating the control signaling information; and
        controlling the test packet generator using the control signaling information to achieve or maintain an average queue depth value at the SUT queue.

2. The method of claim 1 wherein receiving the queue performance information associated with the SUT queue occurs using an out-of-band process comprising:
    requesting, by a feedback controller or a SUT analyzer associated with the NTS, queue performance information associated with the SUT queue; and
    receiving, from the SUT, an application programming interface (API), or a network monitoring agent associated with the SUT, the queue performance information associated with the SUT queue.

3. The method of claim 1 wherein the test packet includes telemetry instructions for instructing the SUT or a related entity to provide telemetry information related to the SUT queue and wherein the queue performance information includes the telemetry information provided by the SUT or the related entity.

4. The method of claim 1 wherein controlling the test packet generator includes adjusting a test traffic rate or adjusting types or characteristics of generated test traffic.

5. The method of claim 4 wherein generating the control signaling information includes computing a change for the test traffic rate in an attempt to achieve a desired traffic rate at the SUT based on a known test traffic rate and the queue performance information.

6. The method of claim 1 wherein the queue performance information includes latency information, processing throughput information, discard or drop information, or queue utilization information.

7. The method of claim 1 wherein the SUT queue handles traffic received on a receive port of the SUT, traffic sent in response to the traffic received on a transmit port of the SUT, or traffic that is similar to the test packet.

8. The method of claim 1 wherein the SUT includes a network switch, a traffic forwarding device, a network interface card (NIC), a programmable gate array (FPGA), an application-specific integrated circuit (ASIC), or a processor.

9. A system for active queue management, the system comprising:
   at least one processor; and
   a network test system (NTS) implemented using the at least one processor, the NTS configured for:
      prior to a test session, determining a baseline for one or more performance metrics associated with performance of a system under test (SUT), wherein the one or more performance metrics include a drain rate associated with a SUT queue of the SUT;
      transmitting, by a test packet generator and during a test session, test packets to the SUT;
      receiving queue performance information associated with the SUT queue related to the test packets;
      generating, utilizing the queue performance information, a known test traffic rate, and the drain rate, control signaling information usable for controlling the test packet generator, wherein generating the control signaling information includes deriving a non-test traffic rate by subtracting the known test traffic rate from a monitored total traffic rate at the SUT and using the derived non-test traffic rate in generating the control signaling information; and
      controlling the test packet generator using the control signaling information to achieve or maintain an average queue depth value at the SUT queue.

10. The system of claim 9 wherein the NTS is configured for receiving the queue performance information associated with the queue using an out-of-band process comprising:
   requesting, by a feedback controller or a SUT analyzer associated with the NTS, queue performance information associated with the SUT queue; and
   receiving, from the SUT, an application programming interface (API), or a network monitoring agent associated with the SUT, the queue performance information associated with the SUT queue.

11. The system of claim 9 wherein the test packet includes telemetry instructions for instructing the SUT or a related entity to provide telemetry information related to the SUT queue and wherein the queue performance information includes the telemetry information provided by the SUT or the related entity.

12. The system of claim 9 wherein controlling the test packet generator includes adjusting a test traffic rate or adjusting types or characteristics of generated test traffic.

13. The system of claim 12 wherein the NTS is configured for computing a change in the test traffic rate in an attempt to achieve a desired traffic rate at the SUT based on a known test traffic rate and the queue performance information.

14. The system of claim 9 wherein the queue performance information includes latency information, processing throughput information, discard or drop information, or queue utilization information.

15. The system of claim 9 wherein the SUT queue handles traffic received on a receive port of the SUT, traffic sent in response to the traffic received on a transmit port of the SUT, or traffic that is similar to the test packet.

16. The system of claim 9 wherein the SUT includes a network switch, a traffic forwarding device, a network interface card (NIC), a programmable gate array (FPGA), an application-specific integrated circuit (ASIC), or a processor.

17. A non-transitory computer readable medium having stored thereon executable instructions that when executed by at least one processor of at least one computer cause the at least one computer to perform steps comprising:
   at a network test system (NTS):
      prior to a test session, determining a baseline for one or more performance metrics associated with performance of a system under test (SUT), wherein the one or more performance metrics include a drain rate associated with a SUT queue of the SUT;
      transmitting, by a test packet generator and during a test session, test packets to the SUT;
      receiving queue performance information associated with the SUT queue related to the test packets;
      generating, utilizing the queue performance information, a known test traffic rate, and the drain rate, control signaling information usable for controlling the test packet generator, wherein generating the control signaling information includes deriving a non-test traffic rate by subtracting the known test traffic rate from a monitored total traffic rate at the SUT and using the derived non-test traffic rate in generating the control signaling information; and
      controlling the test packet generator using the control signaling information to achieve or maintain an average queue depth value at the SUT queue.

18. The non-transitory computer readable medium of claim 17 wherein receiving the queue performance information associated with the SUT queue occurs using an out-of-band process comprising:
   requesting, by a feedback controller or a SUT analyzer associated with the NTS, queue performance information associated with the SUT queue; and
   receiving, from the SUT, an application programming interface (API), or a network monitoring agent associated with the SUT, the queue performance information associated with the SUT queue.

* * * * *